(12) United States Patent
Danielson et al.

(10) Patent No.: US 9,734,340 B1
(45) Date of Patent: Aug. 15, 2017

(54) SYSTEM AND METHOD FOR PROVIDING A HIGH-VALUE IDENTITY

(71) Applicants: Debra Jean Danielson, Somerset, NJ (US); Timothy Gorden Brown, Fort Edward, NY (US); Jeffrey C. Broberg, Barnstable, MA (US); Walter Schaefer, Reno, NV (US)

(72) Inventors: Debra Jean Danielson, Somerset, NJ (US); Timothy Gorden Brown, Fort Edward, NY (US); Jeffrey C. Broberg, Barnstable, MA (US); Walter Schaefer, Reno, NV (US)

(73) Assignee: CA, Inc., New York, NY (US)

( * ) Notice: Subject to any disclaimer, the term of this patent is extended or adjusted under 35 U.S.C. 154(b) by 218 days.

(21) Appl. No.: 13/856,219

(22) Filed: Apr. 3, 2013

(51) Int. Cl.
*H04L 9/32* (2006.01)
*G06F 21/60* (2013.01)
*G06F 21/00* (2013.01)

(52) U.S. Cl.
CPC ................. *G06F 21/60* (2013.01)

(58) Field of Classification Search
CPC ...... H04L 9/3228; H04L 9/3234; G06F 17/30
USPC .................. 726/26, 28; 705/38–40
See application file for complete search history.

(56) References Cited

U.S. PATENT DOCUMENTS

| | | | | |
|---|---|---|---|---|
| 2009/0193250 A1* | 7/2009 | Yokota | ............. | H04L 9/3255 713/156 |
| 2009/0222897 A1* | 9/2009 | Carow | ............. | H04L 63/08 726/6 |
| 2012/0036360 A1* | 2/2012 | Bassu et al. | ............. | 713/168 |
| 2013/0332521 A1* | 12/2013 | Olague | ............. | G06Q 50/01 709/204 |

OTHER PUBLICATIONS

"ID Trust Network Overview," Ipsiti, available at http://www.ipsiti.com/Pages/platform.aspx (searched on Jul. 1, 2013).
"tru.ly Verification API Summary," ProgrammableWeb.com, available at http://www.programmableweb.com/api/tru.ly-verification (searched on Jul. 1, 2013).

\* cited by examiner

*Primary Examiner* — Noura Zoubair
(74) *Attorney, Agent, or Firm* — Baker Botts L.L.P.

(57) ABSTRACT

Methods include receiving a request for verified data from a requesting entity. Methods also include requesting, from a user, consent to obtain user data corresponding to the user. Methods further include receiving the consent and obtaining preliminary data corresponding to the user. Methods also include transmitting a message to a user data provider in response to receiving the consent, in which the message comprises the preliminary data and a request for the user data. Methods also include receiving response data, wherein the response data corresponds to the user data. Methods further include analyzing the response data and determining the verified data in response to analyzing the response data. Methods also include providing the verified data to the requesting entity.

15 Claims, 5 Drawing Sheets

SYSTEM AND METHOD FOR PROVIDING A HIGH-VALUE IDENTITY

BACKGROUND

The present disclosure relates to security and, more specifically, to a system and method for providing a high-value identity.

In a cloud, existing security systems may provide information about a user to entities that are interested in verifying the identity or an attribute of the user. Entities that provide services to users in the cloud may want to learn more about a user in order to determine whether the user is a potential consumer that they would like to target. In order to provide these entities with information about a user, such systems may collect information about the user in a central repository. Typically, the information that is collected is directly provided by the user. For example, such information may correspond to an online identity that the user has established. However, many users may not want a centralized authority to have unnecessary visibility to information about their identities and attributes. Therefore, the information that is often provided by existing systems to interested entities may have weak or no association with a user's real-world identity.

BRIEF SUMMARY

According to an aspect of the present disclosure, a method may comprise receiving a request for verified data from a requesting entity. The method may also comprise requesting, from a user, consent to obtain user data corresponding to the user. The method may further comprise obtaining preliminary data corresponding to the user. The method may also comprise receiving the consent from the user and transmitting a message to a user data provider in response to receiving the consent. The message may comprise the preliminary data and a request for the user data. The method may also comprise receiving response data, in which the response data corresponds to the user data. The method may further comprise analyzing the response data. The method may also comprise determining the verified data in response to analyzing the response data. The method may further comprise providing the verified data to the requesting entity.

Other objects, features, and advantages will be apparent to persons of ordinary skill in the art from the following detailed description and the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
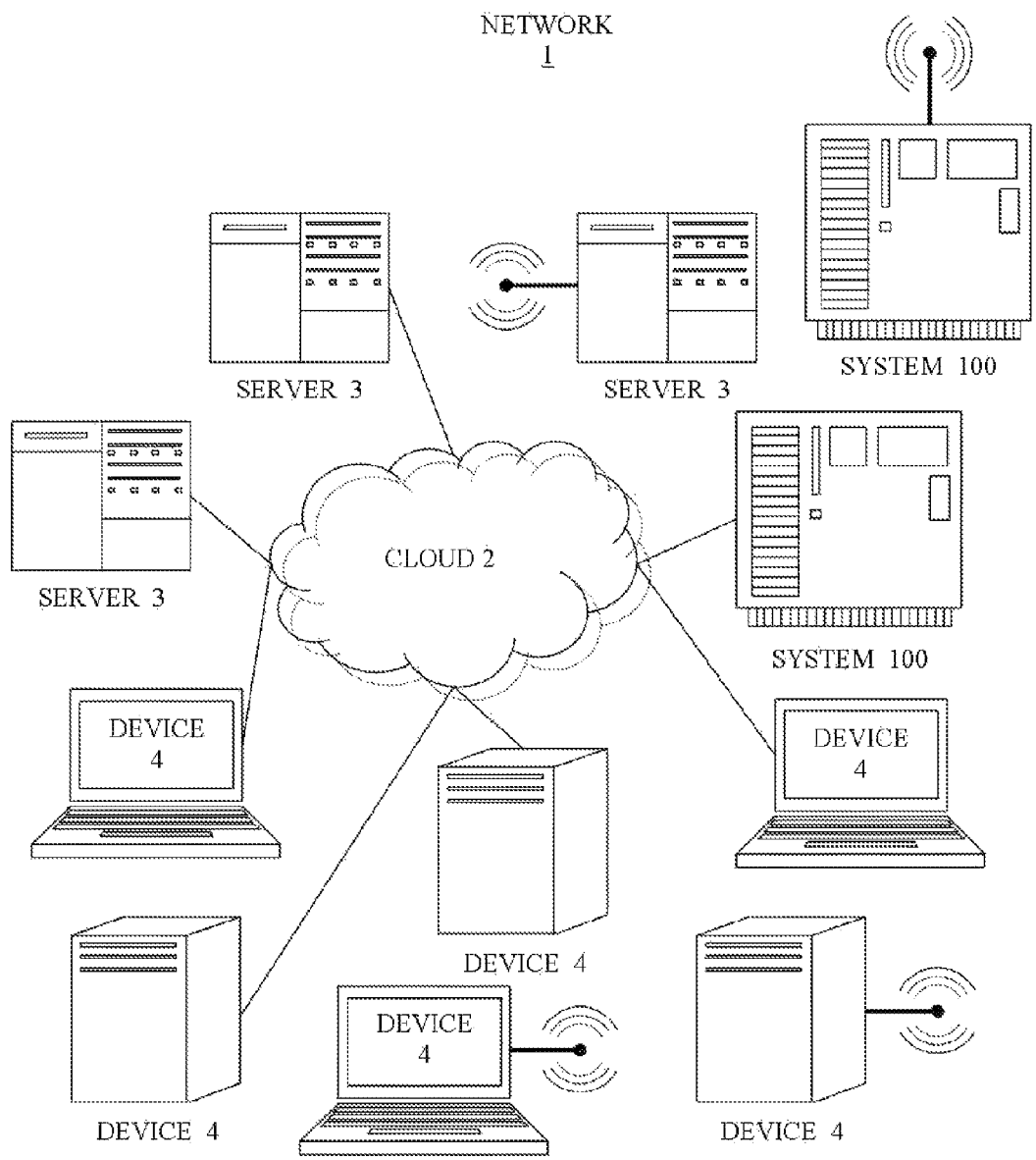
FIG. 1 is a schematic representation of a network 1 monitored by a device for providing verified data to a requesting entity.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or in a combined software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would comprise the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer readable storage medium may be any tangible medium able to contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take a variety of forms comprising, but not limited to, electro-magnetic, optical, or a suitable combination thereof. A computer readable signal medium may be a computer readable medium that is not a computer readable storage medium and that is able to communicate, propagate, or transport a program for use by or in connection with an instruction execution system, apparatus, or device. Program code embodied on a computer readable signal medium may be transmitted using an appropriate medium, comprising but not limited to wireless, wireline, optical fiber cable, RF, etc., or any suitable combination of the foregoing.

Computer program code for carrying out operations for aspects of the present disclosure may be written in a combination of one or more programming languages, comprising an object oriented programming language such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider) or in a cloud computing environment or offered as a service such as a Software as a Service ("SaaS").

Aspects of the present disclosure are described herein with reference to flowchart illustrations and/or block diagrams of methods, apparatuses (e.g., systems), and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that, when executed, may direct a computer, other programmable data processing apparatus, or other devices to function in a particular manner, such that the instructions, when stored in the computer readable medium, produce an article of manufacture comprising instructions which, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses, or other devices to produce a computer implemented process, such that the instructions which execute on the computer or other programmable apparatus provide processes for implementing the functions/acts specified in the flowchart and/or block diagram block or blocks.

While certain example systems and methods disclosed herein may be described with reference to security, systems and methods disclosed herein may also be related to security management; identity and access management; cloud computing; mobility; architecture; database management; data modeling and analysis; information technology ("IT"); project, portfolio, and financial management, software engineering; big data; application development and databases; IT service & assert management; mainframe; middleware and common services; usability and user experience; vertical specific technology application; application performance management; service assurance; alternative software delivery; and infrastructure and operations management. Systems and methods disclosed herein may be applicable to a broad range of applications that monitor various parameters associated with various disciplines, such as, for example, commercial activities (e.g., sales, financial services), IT systems (e.g., access control, provisioning services), and other activities of importance to the user.

Referring now to security, entities that provide services to online users may want to authenticate or verify information about a particular user. These entities may want to learn more about a user in order to determine whether or how they should advertise or provide their services to that user. For example, a company that sells alcoholic beverages online may want to determine whether users that purchase products from their website are over the legal drinking age. As another example, a financial services organization may want to know whether the users that visit its website present a threat to its online operations. Moreover, these entities may be interested in identifying serious or valuable customers that visit their online sites.

Existing security systems may provide information about a user's identity or attributes to a requesting entity. Such systems may collect and store information about the user in a central repository. By collecting and storing information about many users, such systems may generate identity sets. Typically, the information that is collected is directly provided by the user. For example, the information may correspond to an online identity that the user has created. However, because many users do not want a centralized authority to have unnecessary visibility into their personal information (e.g., identity information, personally identifiable information ("PII"), healthcare information, financial information, and other attribute information), the information that is collected may not be reliable. For example, existing systems such as Facebook or Google may provide social identities that have weak or no association with a user's real-world identity to a requesting entity.

In some sophisticated cases, existing systems may attempt to identify the real users in their identity sets. For example, existing systems may flag and remove identities that appear fake (e.g., identities based on a celebrity, identities that are tied to current events). However, oftentimes the methods that are used to identify real users are ineffective. In particular, such methods may accidentally target information corresponding to a real user. Other existing systems may try to authenticate the information in their identity sets by acquiring authentication partners. Still other existing systems may focus on matching information in their identity sets against public and governmental databases, and other existing systems may focus on creating communities with specific credentials that are validated. Examples of such systems include Facebook, Google, Tru.ly, Ipsiti, and credit agencies. Nevertheless, despite providing an added level of authenticity, such systems may collect and/or disclose unnecessary information about a user to a requesting entity.

In particular, such systems may disclose information that the user may not want disclosed to, for example, the requesting entity or a central authority. Referring again to the alcoholic beverages example, existing systems may provide a user's age to the alcoholic beverages company when the company wants to verify whether the user is over the legal drinking age. However, the user may not want his age disclosed to the company; instead, the user may only want the company to know that he is over the legal drinking age.

Systems and methods disclosed herein may provide verified data about a user to a requesting entity. Such systems and methods may obtain identity or attribute information about a user from an identity or provider; similarly, such systems and methods may obtain attribute information about a user from an attribute provider. Such systems and methods may not require a centralized authority to have unnecessary visibility into a user's identity and attribute information. Moreover, such systems and methods may not require an identity or attribute provider to track the verification of any information that they provide.

Systems and methods disclosed herein may also verify information about a user without disclosing unnecessary identity or attribute information about that user to a requesting entity. Additionally, such systems and methods may allow a user to sign on once and gain access to multiple personas. In other words, such systems and methods may authorize end-user single sign-on ("SSO") across multiple personas, which are controlled by the user but validated by definitive authorities. Such systems and methods may also allow for separation of identity verification and attribute verification.

Systems and methods disclosed herein may support federation or joining of multiple identity and attribute providers. Such systems and methods may include a central switching component or mechanism that provides an application programming interface ("API") (e.g., REST, WebService) to entities interested in validating the identity or attributes of a user. These entities may be known as "targets," and the user may be known as a "subscriber." In such systems and methods, the subscriber may initiate a request. For example, a subscriber may want to purchase a product from an e-commerce site. The e-commerce site may want to validate a particular attribute of the subscriber; thus, the e-commerce site may ask the subscriber how he would like to validate the particular attribute. The subscriber may then initiate the request by choosing to validate the particular attribute by using the central switching component. The initiated request may take place at a target that has registered for a validation service provided by the central switching component and provided an option to validate using the validation service in a sign-on or registration mechanism.

During the validation process or transaction, the subscriber, not the central switching component or an identity or attribute provider, is in control of his identity and attribute information. The central switching component may request consent from the subscriber to obtain identity and attribute information about the subscriber. Once the subscriber consents, the central switching component may authenticate or verify the particular attribute by using authentication mechanisms. Such systems and methods may include a broadcast mechanism that allows for multiple responses to the request; thus, such systems and methods may support an environment with sparse data and aged data. Such systems and methods may also include a setup process for identity providers such as a registration or vetting process for determining whether a particular identity provider should be included in the validation framework or ecosystem Using the broadcast mechanism, the request is broadcast to identity or attribute providers, and the responses from such providers are collected and rationalized. Rationalizing the responses may include calculating a validity factor based on reputation data generated through historic transactions and minimal curation and aging data of information that is provided in the responses. The responses may also include reputation factors for each of the identity or attribute provided that responded. The validation transaction may include a value transfer (i.e., payment or other consideration) from the target or requesting entity to the central switchboard component and from the central switchboard component to the identity or attribute providers.

Moreover, systems and methods disclosed herein may separate identity from attribute verification and provide a service that allows for attribute verification while maintaining identity opaqueness. In particular, each transaction performed by the central switchboard may be an identity-based transaction or an attribute-based transaction.

Referring now to FIG. 1, a network monitored by a device for providing verified data to a requesting entity. Network 1 may comprise one or more clouds 2, which may be public clouds, private clouds, or community clouds. Each cloud 2 may permit the exchange of information and services among users that are connected to such clouds 2. In certain configurations, cloud 2 may be a wide area network, such as the Internet. In some configurations, cloud 2 may be a local area network, such as an intranet. Further, cloud 2 may be a closed, private network in certain configurations, and cloud 2 may be an open network in other configurations. Cloud 2 may facilitate wired or wireless communications of information among users that are connected to cloud 2.

Network 1 may comprise one or more servers 3 and other devices operated by service providers, information providers, and other parties. Network 1 also may comprise one or more devices 4 utilized by service consumers, information consumers, and other parties. Service providers and information providers may provide information and services to service consumers and information consumers utilizing the one or more servers 3, which connect to the one or more devices 4 via cloud 2. The services may comprise, for example, information technology services, financial services, business services, access services, monitoring services, operations services, infrastructure services, and other resource-provisioning services. Servers 3 may comprise, for example, one or more of general purpose computing devices, specialized computing devices, mainframe devices, wired devices, wireless devices, monitoring devices, infrastructure devices, and other devices configured to provide one or more of services and information to information consumers and service consumers. Devices 4 may comprise, for example, one or more of general purpose computing devices, specialized computing devices, mobile devices, wired devices, wireless devices, passive devices, routers, switches, mainframe devices, monitoring devices, infrastructure devices, and other devices utilized by service consumers and information consumers. Items may include network 1, cloud 2, servers 3, and devices 4.

Moreover, network 1 may comprise one or more system 100 that may collect information from network 1, cloud 2, servers 3, devices 4, and other devices connected to cloud 2. System 100 may be, for example, one or more of a general purpose computing device, a specialized computing device, a wired device, a wireless device, a mainframe device, an infrastructure device, a monitoring device, and any other device configured collect data from one or more data sources (e.g., servers, sensors, networks, interfaces, other devices). System 100 may connect to cloud 2 and monitor network 1, cloud 2, servers 3, devices 4, and other devices connected to cloud 2 for available information from network 1, cloud 2, servers 3, devices 4, and other devices connected to cloud 2 and available information (e.g., access information, security information, user information, other variable information) about the services and information provided from service providers and information providers. By collecting variable data associated with network 1, cloud 2, servers 3, devices 4, and other devices connected to cloud 2, system 100 may provide verified data about a user to one or more requesting entities.

In some configurations, one or more of servers 3 and devices 4 may comprise system 100. In other configurations, system 100 may be separate from servers 3 and devices 4.

Figure 2:
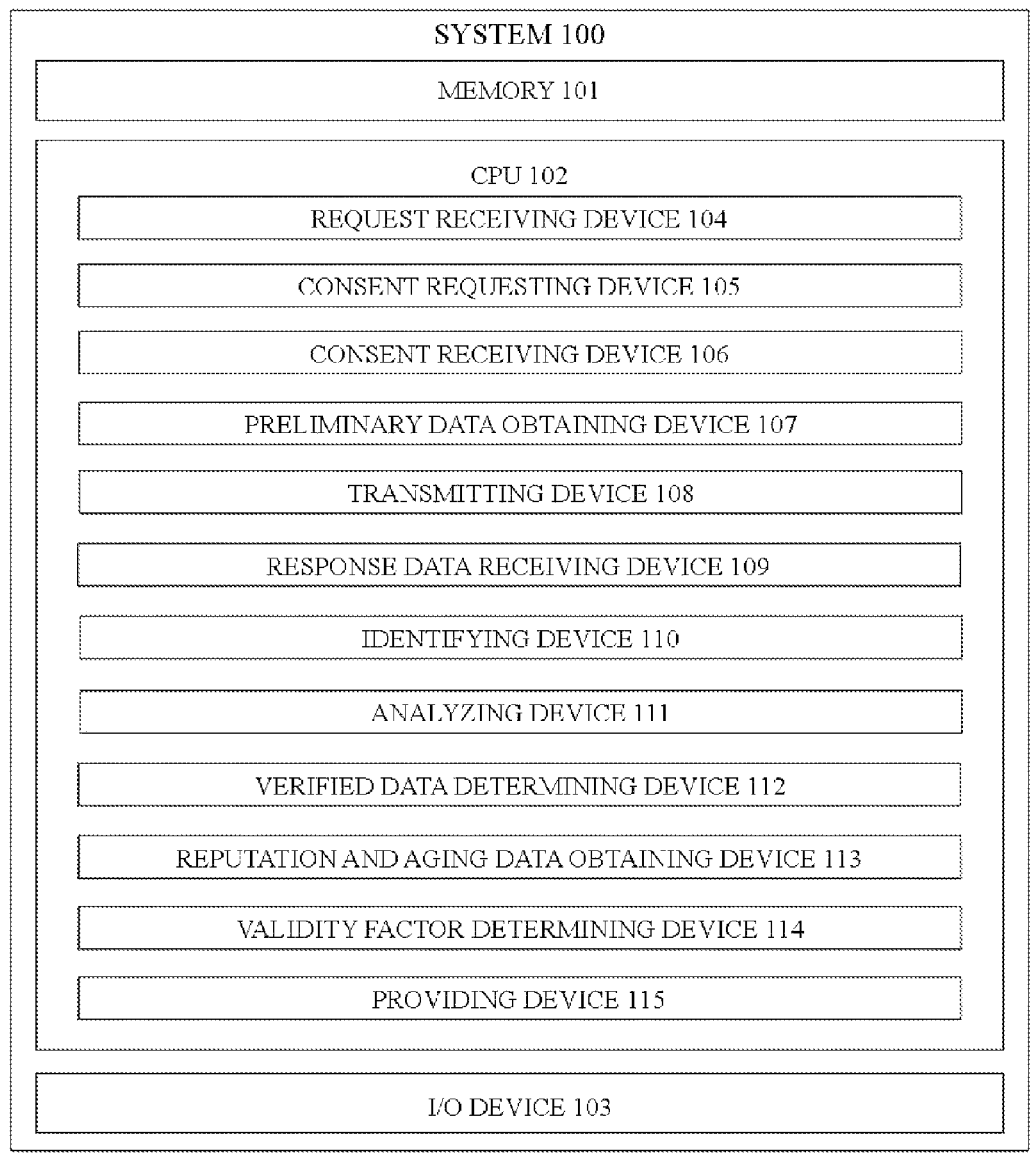
FIG. 2 is a schematic representation of a system configured to provide verified data to a requesting entity.

Referring now to FIG. 2, system 100, which may provide verified data to a requesting entity, now is described. System 100 may comprise a memory 101, a central processing unit ("CPU") 102, and an input and output ("I/O") device 103. Memory 101 may store computer-readable instructions that may instruct system 100 to perform certain processes. In particular, when executed by CPU 102, the computer-readable instructions stored in memory 101 may instruct CPU 102 to operate as one or more of a request receiving device 104, a consent requesting device 105, a consent receiving device 106, a preliminary data obtaining device 107, a transmitting device 108, a response data receiving device 109, an identifying device 110, an analyzing device 111, a verified data determining device 112, a reputation and aging data obtaining device 113, a validity factor determining device 114, and a providing device 115. In particular configurations, one or more of request receiving device 104, consent requesting device 105, consent receiving device 106, preliminary data obtaining device 107, transmitting device 108, response data receiving device 109, identifying device 110, analyzing device 111, verified data determining device 112, reputation and aging data obtaining device 113, validity factor determining device 114, and providing device 115 may be implemented on one or more different CPUs, which may be comprised in remote or local devices.

I/O device 103 may receive one or more of data from cloud 2, data from other devices and sensors connected to system 100, input from a user and provide such information to CPU 102. I/O device 103 may transmit data to cloud 2, may transmit data to other devices connected to system 100, and may transmit a notification to a user (e.g., display a message, make a sound, send an email). Further, I/O device 103 may implement one or more of wireless and wired communication between system 100 and other devices.

Figure 3:
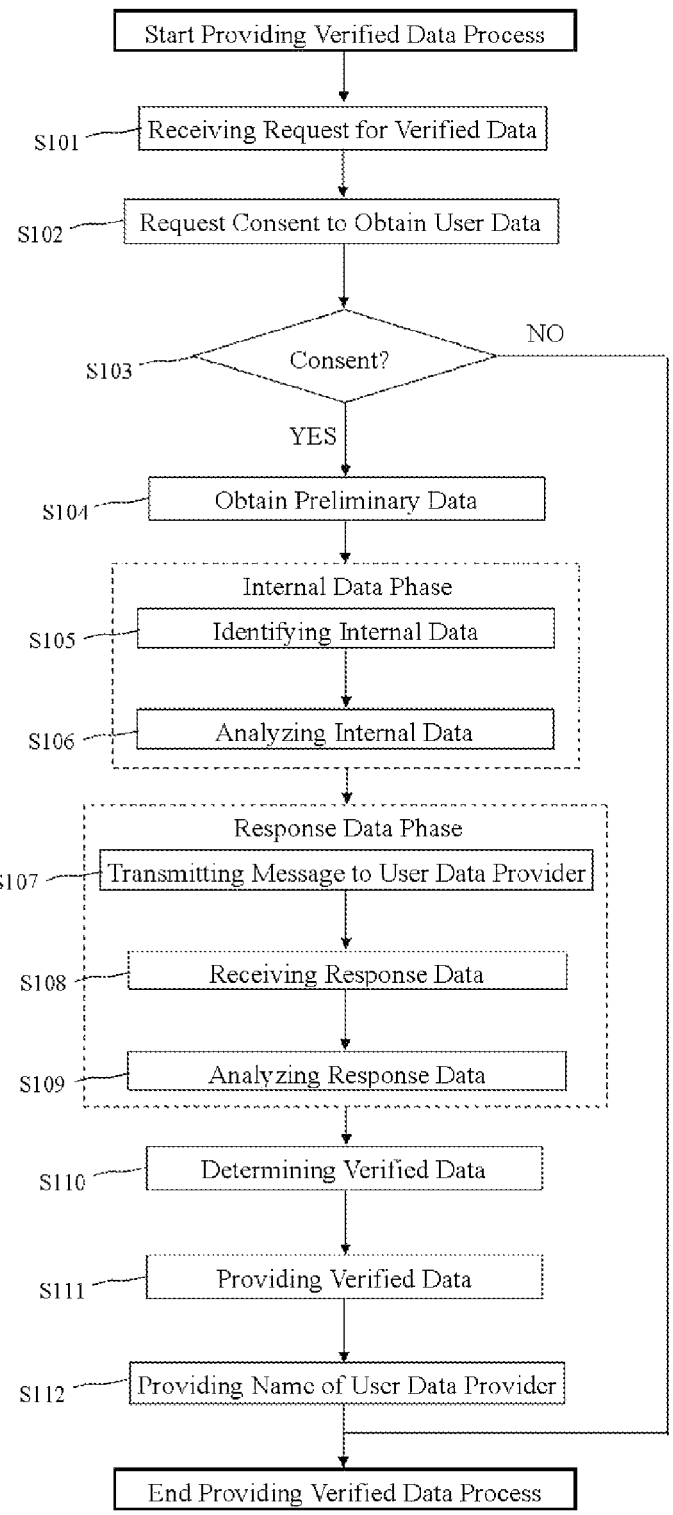
FIG. 3 illustrates a process of providing verified data to a requesting entity.
Figure 4:
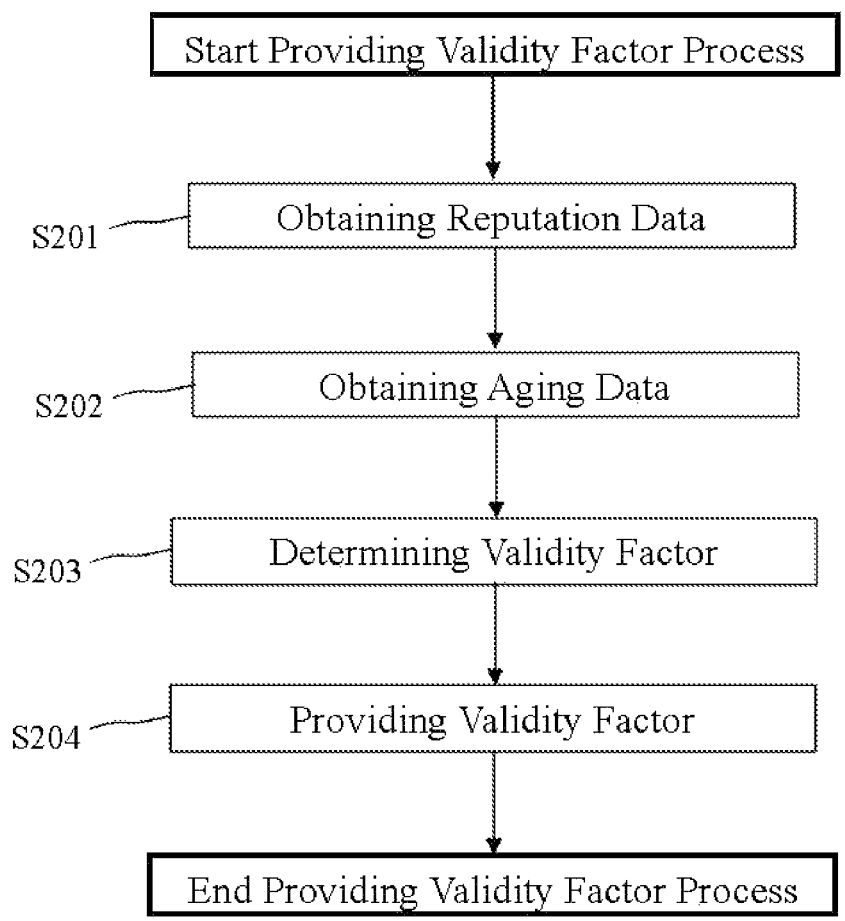
FIG. 4 illustrates a process of providing a validity factor for a user data provider to a requesting entity.

Referring now to FIGS. 3-4, processes performed by request receiving device 104, consent requesting device 105, consent receiving device 106, preliminary data obtaining device 107, transmitting device 108, response data receiving device 109, identifying device 110, analyzing device 111, verified data determining device 112, reputation and aging data obtaining device 113, validity factor determining device 114, and providing device 115 now are described. FIG. 3 depicts a process for providing verified data to a requesting entity. The requesting entity may be an e-commerce business or a business that provides products or services online. In S101, requesting device 104 may receive a request for verified data from a requesting entity. The verified data may be data that the requesting entity is interested in verifying. For example, a company that sells alcoholic beverages online may be interested in verifying whether a user is over the legal drinking age. As another example, an online dating service may be interested in verifying information about a user's identity (e.g., full name, national identification number) or attributes (e.g., age, gender, job position). The verified data may comprise response data (described below), an element of the response data, and a response to a question related to user data. The user data may be identity data or attribute data corresponding to a user. Identity data may comprise PII (i.e., information that can be used to uniquely identify a user) and other information about a user's identity, and attribute data may comprise information about one or more attributes of the user. Thus, a question related to the user data may comprise a question about the user's identity or attributes. For example, the question may ask about the user's age (e.g., "Is the user over the legal drinking age?"), the user's education (e.g., "Does the user have a bachelor's degree?"), the user's income, ("Is the user earning more than the median household income in the U.S.?"), or other identifying information about the user.

In S102, consent requesting device 105 may request, from the user, consent to obtain user data corresponding to the user. As described above, the user data may be identity data or attribute data. The user data may be broad or narrow in scope, depending on the data that the requesting entity is interested in verifying. For example, if the requesting entity is interested in verifying whether the user is of a certain age, then the user data may only comprise data relating to the user's age. On the other hand, if the requesting entity is interested in verifying all identity and attribute information about the user, then the user data may comprise any and all data corresponding to the user. In S102, consent requesting device 105 may send or transmit to the user a message that requests the consent, and the user may provide the consent by responding to the message. Alternatively, consent requesting device 105 may display a question on a screen that asks for the user's consent, and the user may provide the consent by clicking a button or checking a box on the screen.

In S103, consent receiving device 106 may receive the user's consent. If consent receiving device 106 receives the consent (S103: YES), then the process may proceed to S104. If consent receiving device 106 does not receive the consent (S103: NO), then the process may terminate. In S104, preliminary data obtaining device 107 may obtain preliminary data corresponding to the user. Preliminary data obtaining device 107 may obtain the preliminary data from the user, the requesting entity, or another party. The preliminary data may comprise basic identity or attribute information about a user. Such data may be used to identify additional identity or attribute information about the user.

After the obtaining the preliminary data, the process may proceed to S105 and S106. Collectively, S105 and S106 may be known as the "Internal Data Phase." In S105, identifying device 110 may use the preliminary data to identify internal data that corresponds to the user data. Even though the internal data may correspond to the user data, it may not be the same as the user data. For example, if a requesting entity is interested in verifying a user's address, the user data may comprise all information that relates to the user's address, whereas the internal data may only comprise a subset of that information. The internal data may be information that is available from within system 100 or an organization that manages system 100. For example, if a company managed system 100, then information that is found within the company may be considered internal data. The internal data may comprise data that is linked to or associated with the preliminary data. Identifying the internal data may comprise searching within one or more databases located in system 100 or the organization that manages system 100. In S106, analyzing device 111 may subsequently analyze the internal data. Analyzing the internal data may comprise inspecting and cleaning the internal data. For example, analyzing the internal data may involve removing irrelevant parts or errors in the internal data. If the internal data provides an address that has an invalid postal code, then the invalid postal code may be removed from the internal data. Analyzing the internal data may also involve correcting errors in the internal data. Thus, if the internal data provides an address with an invalid postal code, analyzing device 111 may correct the invalid postal code by referencing a directory of postal codes and determining which postal code matches the rest of the address. Analyzing the internal data may also involve identifying and resolving inconsistencies in the internal data. If a requesting entity is interested in verifying a user's age and the internal data reports that the user has two different ages, then analyzing device 111 may attempt to resolve this inconsistency by referencing other information (e.g., the user's birthday). Moreover, analyzing the internal data may comprise determining whether the internal data is reliable. This may include determining whether the internal data comes from a reputable source (e.g., an entity that has historically been reliable, an entity that has a reputation for being reliable), determining whether the internal data was recorded recently, or determining whether the internal data has a strong association with the preliminary data. In addition, analyzing the internal data may comprise organizing the internal data according to one or more parameters, such as organizing the internal data based on the age of the internal data.

Then, in the Response Data Phase, transmitting device 108 and response data receiving device 109 may obtain response data that corresponds to the user data. In S107, transmitting device 108 may transmit a message to a user data provider in response to receiving the consent. The transmission may occur through a secure, validated channel. The user data provider may be an identity provider or an attribute provider. In particular, the user data provider may comprise a payments service provider, a banking provider, a government entity, a social networking service, a credit agency, or an employer. The message may comprise the preliminary data and a request for the user data. Upon receiving the message, the user data provider may identify data that corresponds to the user data and is linked to the preliminary data. The user data provider may subsequently provide this data in response to receiving the message from transmitting device 108. In S108, response data receiving device 109 may receive the data that is identified. Such data may be referred to as the "response data." In S109, analyzing device 111 may subsequently analyze the response data. Analyzing the response data may comprise inspecting and cleaning the response data. For example, analyzing the response data may involve removing irrelevant parts or errors in the response data. Analyzing the response data may also involve correcting errors in the response data. Analyzing the response data may also involve identifying and resolving inconsistencies in the response data. In addition, analyzing the response data may comprise determining whether the response data is reliable. This may include assessing whether the user data provider is a reputable source, determining whether the response data was recently obtained by the user data provider, or determining whether the response data has a strong association with the preliminary data. Moreover, analyzing the response data may comprise organizing the response data according to one or more parameters, such as organizing the response data based on when the response data was originally obtained by the user data provider.

In certain configurations, in S107, transmitting device 108 may transmit a message to a plurality of user data providers. Thus, in S108, response data receiving device 109 may receive response data from one or more user data providers in the plurality of user data providers. Then, in S109, analyzing device 111 may analyze the response data, which may comprise prioritizing the response data according to each of the one or more user data provider's reliability or a measure of such reliability. For example, in addition to comprising data that corresponds to the user data and is linked to the preliminary data, the response data received from a user data provider may also comprise an error or confidence factor for that user data provider. Such error or confidence factor may be a measure of the user data provider's reliability.

In S110, verified data determining device 112 may determine the verified data in response to analyzing the response data and the internal data. Determining the verified data may comprise identifying the verified data. As described above, the verified data may be information about the user that the requesting entity is interested in verifying. For example, the requesting entity may be interested in verifying the identity of the user. Alternatively, the requesting entity may be interested in verifying one or more attributes of the user (e.g., age, gender, address, profession). The verified data may comprise response data, an element of the response data, and/or a response to a question related to the user data. The response data may be data that is identified by a user data provider and is associated with the preliminary data. The response data may comprise one or more elements or units or information. Thus, an element of the response data may be a unit of the response data. A response to a question related to the user data may comprise a question about the user's identity or attributes. After determining the verified data, in S111, providing device 115 may provide the verified data to the requesting entity. Providing the verified data to the requesting entity may comprise sending or transmitting a message to the requesting entity, in which the message comprises the verified data. In S112, providing device 115 may further provide a name corresponding to the user data provider to the requesting entity. The requesting entity may desire such information in order to determine on its own whether the user data provider is a reliable source. In configurations where more than one user data provider provides the response data, providing device 115 may provide, for each of the more than one user data providers, a name corresponding to that user data provider.

In certain configurations, the Internal Data Phase (i.e., S105 and S106) may be omitted. In such configurations, in S110, verified data determining device 112 may only determine the verified data in response to analyzing the response data. In other configurations, the Response Data Phase may occur before or concurrently with the Internal Data Phase. In particular configurations, S104 may be performed before or concurrently with S101, S102, or S103. In certain configurations, S112 may be omitted.

Referring now to FIG. 4, a process of providing a validity factor for a user data provider to a requesting entity, now is described. In S201 and S202, reputation and aging data obtaining device 113 may obtain reputation data and aging data corresponding to the user data provider and/or response data received from the user data provider. As described above, the user data provider may provide response data corresponding to the user data to system 100. Reputation data may comprise information about the user data provider's ability to provide valid, accurate, and complete data. Reputation data may be generated through historical transactions with the user data provider. For example, if a user data provider provided response data in a past transaction that has proven to be accurate (e.g., a requesting entity reported that the response data was accurate), then reputation data may be generated that indicates that the user data provider is able to provide accurate data. Reputation data may also be defined by the general public or one or more third parties. For example, a government entity that is considered by the general public to be a source of accurate data may have reputation data that indicates such. Aging data may comprise information about when the response data was originally received by the user data provider. In 5203, validity factor determining device 114 may then determine a validity factor for the user data provider based on the reputation data and the aging data. The validity factor may be a measure of how reliable the response data provided by the user data provider is. For example, the validity may be higher if the reputation data indicates that the user data provider is able to provide accurate data. The validity factor may also be higher if the aging data indicates that the response data was recently received by the user data provider. Alternatively, the validity factor may be lower if the reputation data indicates that the user data provider provides incomplete data and had received the response data a long time ago. After determining the validity factor, providing device 115 may provide the validity factor to the requesting entity in S204.

In certain configurations, the process depicted in FIG. 3 may comprise the process depicted in FIG. 4. In such configurations, S201 through S204 may be performed concurrently with or after the Response Data Phase, S110, or S111. Moreover, in such configurations, the validity factor determined in S5203 may be used in analyzing the response data in S109. For example, analyzing the response data may comprise determining whether the response data is reliable, which may involve determining whether the validity factor for the user data provider is greater than a predetermined threshold. The predetermined threshold may be defined by the requesting entity or another party. In configurations where a plurality of user data providers provides the response data, S201 through S204 may be performed for each of the plurality of user data providers. Furthermore, analyzing the respond data may comprise prioritizing the response data according to the validity factor determined for each of the plurality of user data providers.

Figure 5:
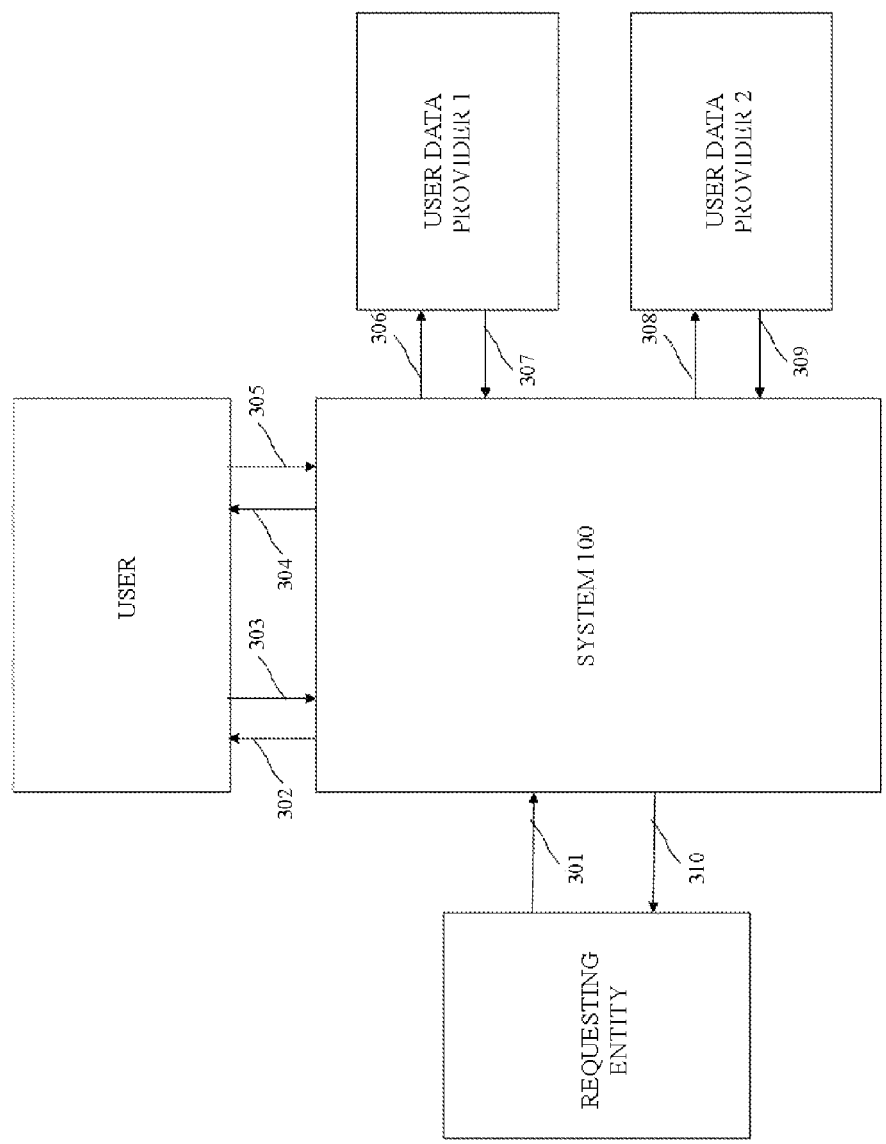
FIG. 5 depicts a block diagram of a configuration for providing verified data to a requesting entity.

Referring now to FIG. 5, a block diagram of a configuration for providing verified data to a requesting entity, now is described. In FIG. 5, the requesting entity may want to verify a user's address. Thus, the requesting entity may send a request for verified data to system 100. Signal 301 may represent this request. System 100 may receive signal 301 from the requesting entity. System 100 may then request consent from the user to obtain user data corresponding to the user. Because the requesting entity is interested in verifying the user's address, the user data may comprise information relating to the user's address. To request consent, system 100 may send a first message to the user, wherein the first message comprises a request for consent. Signal 302 may represent this first message. The user may receive signal 302 and provide consent by responding to the request. The user's response, represented by signal 303, may be received by system 100. System 100 may then obtain preliminary data about the user. In particular, system 100 may obtain the preliminary data from the user by sending a second message, represented by signal 304, to the user and receiving a response, represented by signal 305, from the user. The second message may comprise a request for the preliminary data, and the user's response may comprise the preliminary data. The preliminary data that system 100 obtains may be the user's full name.

After obtaining the user's full name, system 100 may transmit a third message to a first user data provider. The first user data provider may be referred to as "user data provider 1." Concurrently or subsequently, system 100 may also transmit a fourth message to a second user data provider. The second user data provider may be referred to as "user data provider 2." Signal 306 may represent the third message, and signal 308 may represent the fourth message. The third message and the fourth message may each comprise the preliminary data and a request for the user data. Upon receiving signal 306, user data provider 1 may identify data that corresponds to the user data (i.e., information that is related to the user's address) and is associated with the preliminary data (i.e., the user's full name). User data provider 1 may subsequently provide this data via signal 307 to system 100. Similarly, upon receiving signal 308, user data provider 2 may identify data that corresponds to the user data and is associated with the preliminary data. User data provider 2 may then provide this data via signal 309 to system 100.

System 100 may then analyze the data provided by user data provider 1 and user data provider 2. Suppose that user data provider 1 provided a first address for the user, and user data provider 2 provided a second address for the user. If the first address and the second address are different, then system 100 may organize the two addresses based on one or more parameters. For instance, if system 100 determines a validity factor for each user data provider, then system 100 may prioritize the two addresses based on which user data provider has a higher validity factor. System 100 may also organize the two addresses based on which address was first received by user data provider 1 or user data provider 2. System 100 may then determine the verified data and provide the verified data to the requesting entity. Because the requesting entity is interested in verifying the user's address, system 100 may determine that the verified data is the first address and the second address. Accordingly, system 100 may provide the first address and the second address to the requesting entity. The first address and the second address may be organized according to one or more parameters, as discussed. System 100 may also provide a name corresponding to each identity provider to the requesting entity. The requesting entity may then reference the names to determine whether it trusts the information provided by one user data provider more than the other.

Suppose alternatively that user data provider 1 provided an address and user data provider 2 provided a first street name. If the address includes a second street name that is the same as the first street name provided by user data provider 2, then system 100 may clean the response data by removing the first street name from the response data. System 100 may subsequently determine that the verified data is the address, and provide the address to the requesting entity.

The flowcharts and diagrams in FIGS. 1-5 illustrate the architecture, functionality, and operation of possible implementations of systems, methods, and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to comprise any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. For example, this disclosure comprises possible combinations of the various elements and features disclosed herein, and the particular elements and features presented in the claims and disclosed above may be combined with each other in other ways within the scope of the application, such that the application should be recognized as also directed to other embodiments comprising other possible combinations. The aspects of the disclosure herein were chosen and described in order to best explain the principles of the disclosure and the practical application and to enable others of ordinary skill in the art to understand the disclosure with various modifications as are suited to the particular use contemplated.

What is claimed is:

1. A method comprising:
   receiving, from a requesting commercial entity, a request to verify whether personal information of a user satisfies particular criteria;
   in response to receiving the request to verify whether personal information of the user satisfies the particular criteria, requesting consent from the user to obtain, from a third party, the personal information, wherein requesting consent from the user comprises transmitting a first message to the user;
   receiving the consent from the user in response to the first message;
   obtaining preliminary data corresponding to the user;
   transmitting a second message to a plurality of user data providers in response to receiving the consent, wherein the second message comprises the preliminary data and a request for the personal information;
   receiving response data comprising the personal information, from two or more of the plurality of user data providers, the response data from the two or more of the plurality of user data providers comprising user data linked to the preliminary data;
   analyzing, using a hardware processor, the response data;
   determining, using the hardware processor, whether the personal information of the user satisfies the particular criteria, in response to analyzing the response data; and
   in response to determining that the personal information of the user satisfies the particular criteria, verifying, to the commercial entity, that the personal information satisfies the particular criteria, without providing the personal information to the commercial entity,
   wherein analyzing the response data comprises:
      obtaining reputation data and aging data corresponding to the two or more of the plurality of user data providers;
      determining a validity factor corresponding to each of the two or more of the plurality of user data providers based on the reputation data and the aging data;
      providing the validity factor corresponding to each of the two or more of the plurality of user data providers to the commercial entity;
      determining whether the validity factor corresponding to at least one of the two or more of the plurality of user data providers is greater than a predetermined threshold; and
      prioritizing the response data based on which user data provider of the two or more of the plurality of user data providers has a higher validity factor.

2. The method of claim 1, wherein the personal information comprises at least one of: identity data and attribute data.

3. The method of claim 1, wherein the plurality of user data providers is selected from a group comprising: a payments service provider, a banking provider, a government entity, a social networking service, a credit agency, and an employer.

4. The method of claim 1, further comprising providing a name corresponding to at least one of the two or more of the plurality of user data providers to the commercial entity.

5. The method of claim 1, further comprising:
   using the preliminary data to identify internal data corresponding to the personal information;
   and analyzing the internal data;
   wherein verifying that the personal information satisfies the particular criteria comprises verifying that the personal information satisfies the particular criteria in response to analyzing the response data and the internal data.

6. A system comprising:
   a first receiving device configured to receive, from a requesting commercial entity, a request to verify whether personal information of a user satisfies particular criteria;
   a requesting device configured to, in response to receiving the request to verify whether the personal information of the user satisfies particular criteria, request consent from the user to obtain, from a third party, the personal information, wherein requesting consent from the user comprises transmitting a first message to the user;
   a second receiving device configured to receive the consent from the user in response to the first message;
   a first obtaining device configured to obtain preliminary data corresponding to the user;
   a transmitting device configured to transmit a second message to a plurality of user data providers in response to receiving the consent, the second message comprising the preliminary data and a request for the personal information;
   a third receiving device configured to receive response data comprising the personal information, from two or more of the plurality of user data providers, the response data from the two or more of the plurality of user data providers comprising user data linked to the preliminary data;
   a first analyzing device configured to analyze the response data;
   a first determining device configured to determine whether the personal information of the user satisfies the particular criteria, in response to analyzing the response data;
   a first providing device configured to, in response to determining that the personal information of the user satisfies the particular criteria, verify, to the commercial entity, that the personal information satisfies the particular criteria, without providing the personal information to the commercial entity,
   a second obtaining device configured to obtain reputation data and aging data corresponding to the two or more of the plurality of user data providers;
   a second determining device configured to determine a validity factor corresponding to each of the two or more of the plurality of user data providers based on the reputation data and the aging data; and a second providing device configured to provide the validity factor corresponding to each of the two or more of the plurality of user data providers to the commercial entity, wherein the first analyzing device is configured to determine whether the validity factor corresponding to at least one of the two or more of the plurality of user data providers is greater than a predetermined threshold, and wherein the first analyzing device is configured to prioritize the response data based on which user data provider of the two or more of the plurality of user data providers has a higher validity factor.

7. The system according to claim 6, wherein the personal information comprises at least one of: identity data and attribute data.

8. The system according to claim 6, wherein the plurality of user data providers is selected from a group comprising: a payments service provider, a banking provider, a government entity, a social networking service, a credit agency, and an employer.

9. The system of claim 6, further comprising a third providing device configured to provide a name corresponding to at least one of the two or more of the plurality of user data providers to the commercial entity.

10. The system of claim 6, further comprising:
an identifying device configured to identify, using the preliminary data, internal data corresponding to the personal information; and
a second analyzing device configured to analyze the internal data;
wherein the first determining device is configured to verify that the personal information satisfies the particular criteria in response to analyzing the response data and the internal data.

11. A computer program product comprising:
a non-transitory computer readable storage medium having computer readable program code embodied therewith, the computer readable program code comprising:
computer readable program code configured to receive, from a requesting commercial entity, a request to verify whether personal information of a user satisfies particular criteria;
computer readable program code configured to, in response to receiving the request to verify whether personal information of a user satisfies particular criteria, transmit to the user a request for consent from the user to obtain, from a third party, the personal information, wherein requesting consent from the user comprises transmitting a first message to the user;
computer readable program code configured to receive the consent from the user in response to the first message;
computer readable program code configured to, in response to receiving the consent from the user, sending the user a second message requesting preliminary data corresponding to the user;
computer readable program code configured to obtain the preliminary data corresponding to the user;
computer readable program code configured to transmit a third message to a plurality of user data providers in response to receiving the consent, the third message comprising the preliminary data and a request for the personal information;
computer readable program code configured to receive response data comprising the personal information from two or more of the plurality of user data providers, the response data from the two or more of the plurality of user data providers comprising user data linked to the preliminary data;
computer readable program code configured to analyze the response data;
computer readable program code configured to determine whether the personal information of the user satisfies the particular criteria, in response to analyzing the response data, and
computer readable program code configured to in response to determining that the personal information of the user satisfies the particular criteria, verify, to the commercial entity, that the personal information of the user satisfies the particular criteria, without providing the personal information to the commercial entity;
computer readable program code configured to obtain reputation data and aging data corresponding to the two or more of the plurality of user data providers;
computer readable program code configured to determine a validity factor corresponding to each of the two or more of the plurality of user data providers based on the reputation data and the aging data;
computer readable program code configured to provide the validity factor corresponding to each of the two or more of the plurality of user data providers to the commercial entity;
computer readable program code configured to determine whether the validity factor corresponding to at least one of the two or more of the plurality of user data providers is greater than a predetermined threshold; and
computer readable program code configured to prioritize the response data based on which user data provider of the two or more of the plurality of user data providers has a higher validity factor.

12. The computer program product according to claim 11, wherein the plurality of user data providers is selected from a group comprising: a payments service provider, a banking provider, a government entity, a social networking service, a credit agency, and an employer.

13. The computer program product according to claim 11, wherein the personal information comprises at least one of: identity data and attribute data.

14. The computer program product according to claim 11, further comprising computer readable program code configured to provide a name corresponding to at least one of the two or more of the plurality of user data providers to the commercial entity.

15. The computer program product according to claim 11, further comprising:
computer readable program code configured to identify, using the preliminary data, internal data corresponding to the personal information; and
computer readable program code configured to analyze the internal data;
wherein the computer readable program code configured to verify that the personal information satisfies the particular criteria in response to analyzing the response data and the internal data.

* * * * *